United States Patent [19]

Rugienius

[11] 4,452,488
[45] Jun. 5, 1984

[54] SEAT ASSEMBLY

[75] Inventor: Algis J. Rugienius, Warren, Mich.

[73] Assignee: General Motors Corporation, Detroit, Mich.

[21] Appl. No.: 329,658

[22] Filed: Dec. 11, 1981

[51] Int. Cl.³ .............................................. A47C 7/02
[52] U.S. Cl. ...................................... 297/452; 5/408; 297/DIG. 1; 297/DIG. 2; 297/218; 297/455
[58] Field of Search ................. 297/DIG. 1, DIG. 2, 297/218, 219, 454, 455, 456, 452; 29/91, 91.2, 91.3; 5/402, 408, 409, 410, 411

[56] References Cited

U.S. PATENT DOCUMENTS

| | | | |
|---|---|---|---|
| 3,266,065 | 8/1966 | Bereday | 5/408 |
| 3,848,925 | 11/1974 | Harder, Jr. | 297/452 |
| 3,853,352 | 12/1974 | Ambrose | 297/DIG. 1 |
| 3,961,823 | 6/1976 | Caudill, Jr. | 297/DIG. 1 |
| 4,142,757 | 3/1979 | Fogle, Jr. et al. | 296/63 |
| 4,246,734 | 1/1981 | Folle, Jr. et al. | 297/DIG. 2 |
| 4,332,419 | 1/1982 | Vogel | 297/DIG. 2 |

FOREIGN PATENT DOCUMENTS

| | | | |
|---|---|---|---|
| 273402 | 2/1967 | Australia . | |
| 812143 | 5/1969 | Canada | 297/452 |
| 2023803 | 12/1971 | Fed. Rep. of Germany | 297/452 |
| 2517077 | 10/1976 | Fed. Rep. of Germany . | |
| 2306659 | 11/1976 | France | 297/DIG. 2 |

Primary Examiner—James T. McCall
Attorney, Agent, or Firm—Herbert Furman

[57] ABSTRACT

A seat assembly includes a hollow molded seat support having a series of rib portions between paired depressions. A foam seat cushion is provided with an access passage which opens to the series of rib portions and an anchor member traversing the passage. The access passage permits the anchor member to be hog ringed to the rib portions. An envelope type cover fits over the cushion and support and is hog ringed to an edge of the support.

4 Claims, 6 Drawing Figures

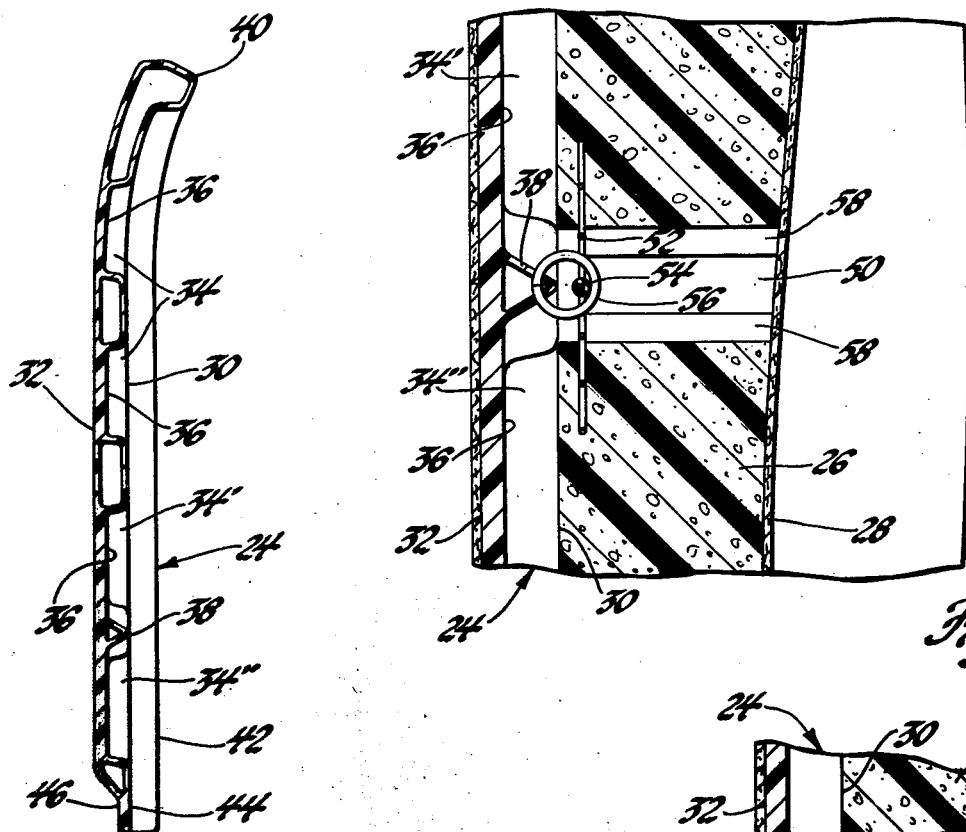
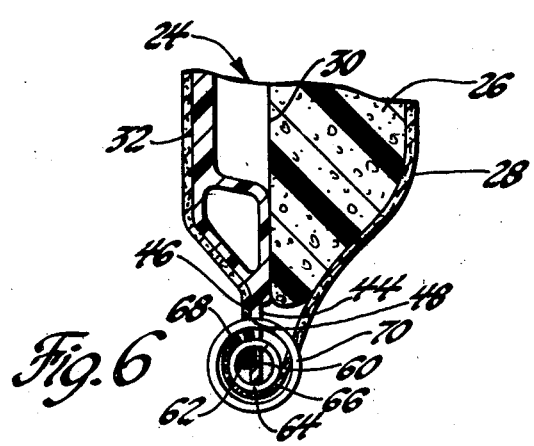
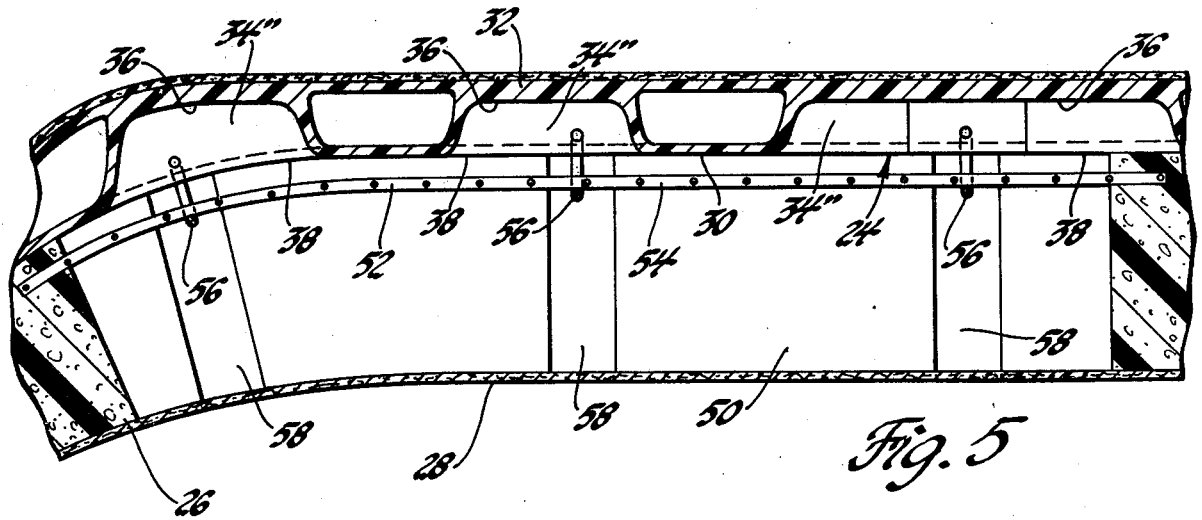
Fig. 3
Fig. 4
Fig. 6
Fig. 5

SEAT ASSEMBLY

This invention relates to seat assemblies and more particularly to seat assemblies of the type including a hollow molded seat support, a resilient foam cushion, and a cover for the cushion and support.

BACKGROUND OF THE INVENTION

It is known to form hollow molded supports, such as seat supports, either by the blow molding process or the rotational casting process as disclosed in Australian Pat. No. 273,402; Fogle Jr. et al U.S. Pat. No. 4,142,757; and Harder Jr. U.S. Pat. No. 3,848,925. Generally, such supports include spaced walls which can be reinforced by a series of depressions extending inwardly of one wall and integral with the other wall. When the support is incorporated in a vehicle seat assembly which includes a cushion, the cushion must be secured to the support. Fogle Jr. does not disclose any manner of securement of a seat cushion to a hollow molded seat support while Harder Jr. discloses the use of keyhole apertured metal strips which are secured over depressions in the seat support and receive buttons on the cushion in order to secure the cushion to the support. It is desirable that the cushion be securable to the seat support on a mass production basis and with minimum assembly operations. If the seat assembly includes a cover, it is desirable that its securement meet these same criteria.

In the preferred embodiment of this invention, the hollow molded seat support includes spaced walls and a number of depressions which extend inwardly from one wall to the other wall and are integral therewith. Certain of these depressions are arranged in rows with the depressions of the rows being paired with each other. One of the walls of the support intermediate the paired depressions is provided with a series of integral rib portions. The seat cushion seats on this one wall and is formed with elongated passages which extend through the cushion and open to each of the series of rib portions. A seat cushion anchor member spans each passage adjacent a respective series of rib portions and is hog ringed to the rib portions in order to secure the cushion to the support. An envelope type cover is then slipped over the cushion and support and hog ringed to an edge of the support in order to complete the seat assembly.

By providing the attachment means for the cushion integral with the seat support, the assembly of the cushion to the support can be made expeditiously with conventional hog ringing tools and without any additional parts or fasteners or assembly operations being necessary. The seat cushion anchor member can be in the form of a bolster wire which is integral with or secured to a strip of mesh embedded in the cushion during the foaming process. Again, no additional parts or fasteners or assembly operations are required. The attachment of the cover may be conveniently made to an edge portion of the support formed by the integral walls. This edge portion may be provided with a series of integral depressions to provide thin wall portions for ease of hog ringing with conventional tools.

Thus the components of the seat assembly of this invention can be each formed as a complete component and then assembled to each other in a very simple and expeditious manner and without requiring any additional fasteners or parts or assembly operations.

The primary object of this invention is to provide an improved seat assembly which includes a hollow molded plastic support having a series of integral rib portions which are secured to a foam cushion, with an envelope type cover over both the seat support and cushion. Another object is to provide such a seat assembly wherein the cushion is provided with passages which open to a respective series of rib portions, with each passage being spanned by an anchor member adjacent the rib portions so as to be secured thereto to assemble the cushion and support. A further object is to provide such a seat assembly wherein the seat cushion anchor member is in the form of a bolster wire of a strip of mesh embedded in the cushion during the foaming process.

BRIEF DESCRIPTION OF THE DRAWINGS

These and other objects of the invention will be apparent from the following specification and drawings wherein:

FIG. 3 is an enlarged sectional view taken generally along the plane indicated by line 3—3 of FIG. 2;

FIG. 4 is an enlarged sectional view taken generally along the plane indicated by line 4—4 of FIG. 2;

FIG. 5 is an enlarged sectional view taken generally along the plane indicated by line 5—5 of FIG. 2; and FIG. 6 is an enlarged sectional view taken generally along the plane indicated by line 6—6 of FIG. 2.

DESCRIPTION OF THE PREFERRED EMBODIMENT

Figure 1:
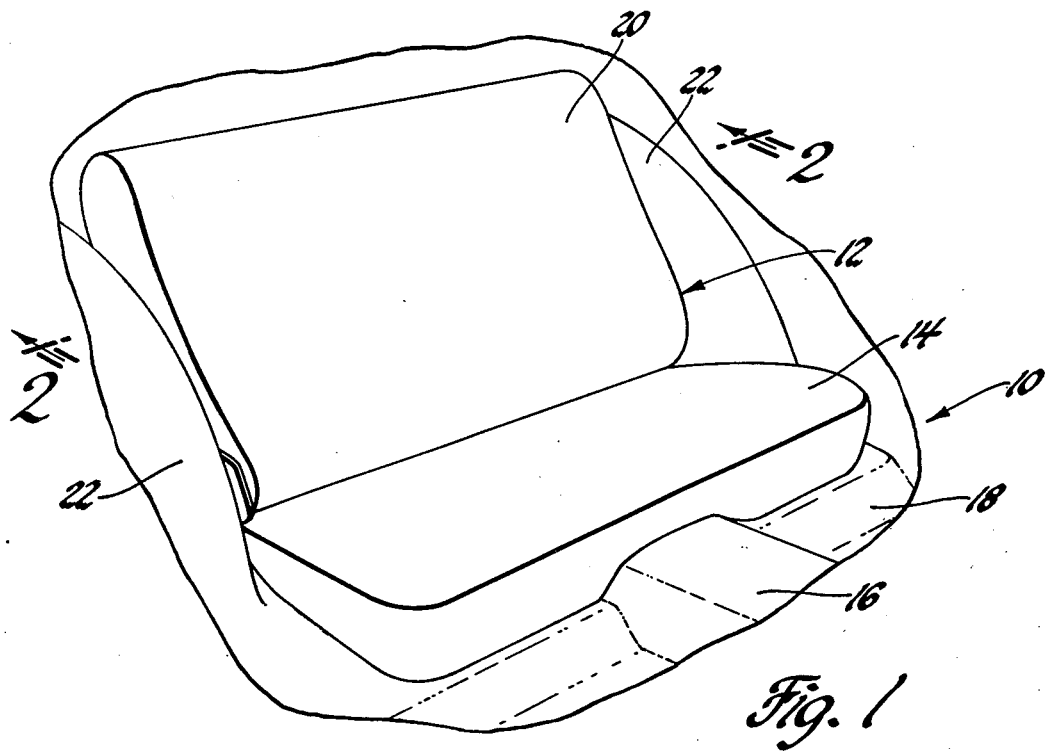
FIG. 1 is a partial view of the interior of a vehicle having a seat assembly according to this invention.
Figure 2:
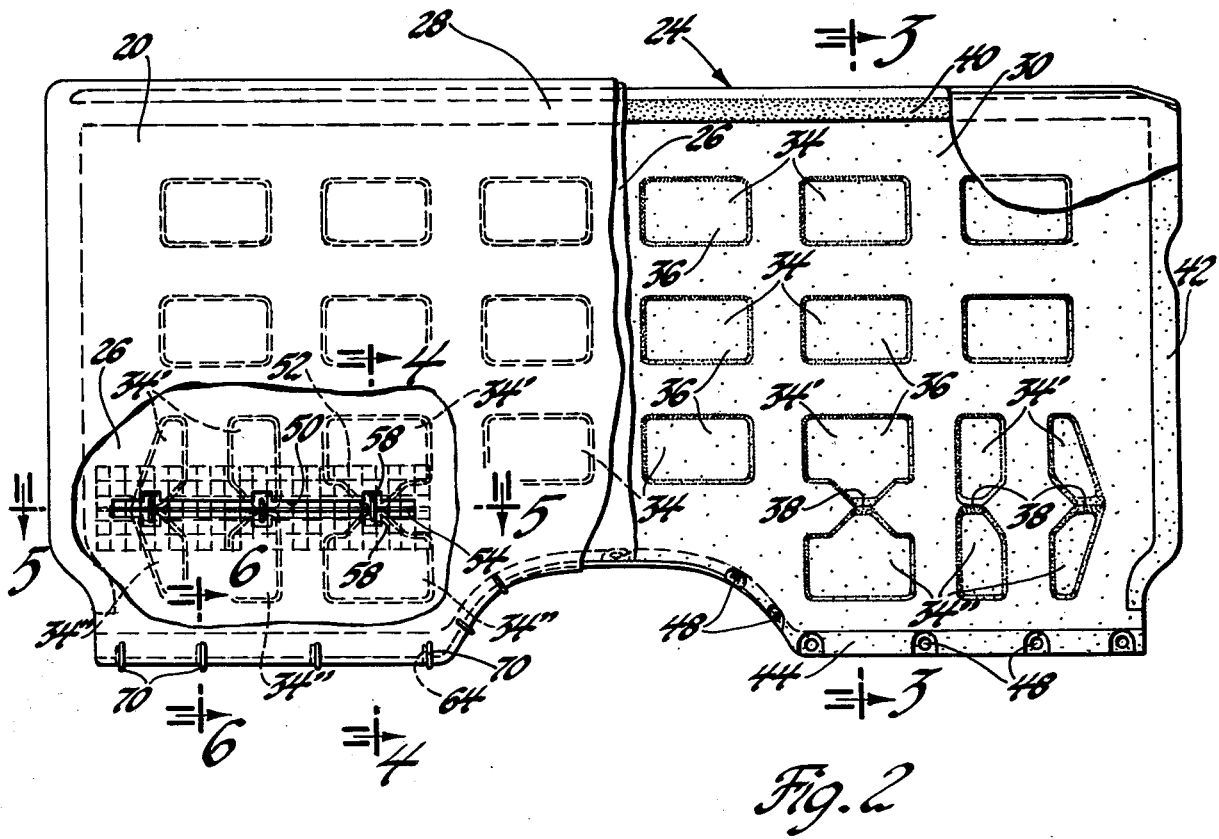
FIG. 2 is a partially broken-away view taken generally along the plane indicated by line 2—2 of FIG. 1.

Referring now to FIG. 1 of the drawings, a vehicle body designated generally 10 includes a rear seat 12 which includes a seat cushion 14 mounted over the tunnel 16 of the floor pan 18 and a seat back 20 which is located between the wheelhouses 22 of the body. The seat back 20 may either be mounted to the seat cushion 14 or to the body and may be fixed or pivoted for folding movement relative to the seat cushion. The seat back 20 is formed in accordance with this invention and, as shown in FIG. 2, generally includes a hollow blow molded seat support 24, a foam cushion 26 and an envelope type cover 28.

As shown in FIGS. 2 through 5, the seat support 24 includes a first or forwardly facing wall 30 and a second or rearwardly facing wall 32 which are normally spaced from each other except as hereinafter described. At a number of locations, the wall 30 is provided with variously shaped integral depressions 34, 34', and 34", which extend inwardly thereof and have their base walls 36 integrally joined to the wall 32. A row of depressions 34' is paired with a row of depressions 34" on the right hand and left hand sides of support 24, to each side of the vertical center line thereof. The wall 30 intermediate each pair of depressions 34' and 34" is provided with an integral generally V-shape cross-section elongated rib portion 38 as best shown in FIGS. 3 and 4. The rib portions are hollow and generally coplanar with the wall 30 although they may be otherwise located with respect to this wall, if desired. The elongated rib portions are arranged in series relationship or generally longitudinally aligned. The walls 30 and 32 are connected together across their upper edge by an integral hollow rib or upper edge portion 40 as best shown in FIG. 3, and are connected along their side edges by integral hollow ribs or edge portions 42. At the lower edge of the seat support, the walls 30 and 32 terminate in flanges 44 and 46 respectively which are integral with each other as shown in FIGS. 3 and 6. At spaced locations, the flange 44 is provided with integral spaced depressions 48, FIG. 2.

While the paired depressions 34' and 34" and rib portions 38 are shown adjacent the lower edge of the seat support, such paired depressions and intermediate rib portions may be provided in other areas of the seat support, if desired.

The seat cushion 26 is formed of foam material. As can be seen in FIGS. 3 and 5, the side portions and the upper edge portion of the seat support 24 are slightly arcuate and the inner wall of the cushion 26 is appropriately shaped so as to nest on the wall 30 and flange 44 within the ribs 40 and 42. These ribs act to locate the cushion on the seat support. During the molding process, the cushion 26 is provided with spaced elongated passages 50 which extend entirely therethrough and open to each series of rib portions 38 of the paired depressions 34' and 34". A strip of plastic mesh 52 is embedded in the cushion adjacent the inner wall thereof and across each passage 50 during the molding process. Each strip of mesh includes an enlarged bolster wire 54 formed integral therewith and extending longitudinally across a passage 50 generally centrally thereof. If desired, the bolster wire may be formed separately, covered with either paper or plastic, and be secured to the mesh prior to embedment in the cushion. Both types of bolster wires are shown and described in further detail in Caudill, Jr., U.S. Pat. No. 3,961,823, Vehicle Seat Bolster Wire Assembly, assigned to the assignee of this invention. As shown in FIGS. 4 and 5, each bolster wire 54 is located in adjacent spaced relationship to a respective series of rib portions 38 and in general alignment therewith.

After the seat cushion 26 is nested on the seat support 24, a conventional hog ringing tool is inserted into the passage 50 and each bolster wire 54 is hog ringed at 56 to each of the rib portions 38 to assemble the cushion and seat support. As shown in FIGS. 2, 4 and 5, the passage 50 is provided with cross passages 58 which open thereto at each of the locations for the hog rings 56 in order that the tool, not shown, can be easily inserted into the passage 48 at the proper location for the hog ringing operation.

The cover 28 is in the form of a downwardly opening envelope and may be formed of cloth or plastic or leather or a combination of these materials. The envelope is formed in a separate sewing operation and is then slipped over the assembled cushion 26 and support 24. The lower open end of the envelope is located at the flanges 44 and 46 after assembly. In order to secure the cover in place, the rearward lower edge 60 thereof is provided with a pocket in which is inserted a wire 62. This wire spans the lower edge of the seat support along flange 46 and is hog ringed at 64 to the flanges 44 and 46 at each of the depressions 48 in the flange 44. The forward lower edge 66 of the cover likewise terminates in a pocket in which is inserted a wire 68 which also conforms to the lower edge of the seat support. This edge is wrapped around the edge 60 and the wire 68 is hog ringed at 70 to each of the depressions 48 to thereby secure both the forward and rearward walls of the cover to the seat support. The depressions 48 thus act as a locator for the hog rings 64 and 70 while also providing reduced thickness portions of the seat support for ease of hog ringing.

From the foregoing description it can be seen that the seat support 24 may be formed by blow molding or rotational casting and once formed, does not require any additional operations or require any parts or fasteners to be assembled thereto. Likewise, the cushion 26 may be formed in a molding operation with the strip of mesh 52 and bolster wire 54 embedded therein. The seat support and the foam cushion can then be assembled by a conventional hog ring tool. Thereafter, the seat cover can be slipped over the assembled cushion and support and hog ringed to the support to complete the seat assembly.

Thus this invention provides an improved seat assembly.

The embodiments of the invention in which an exclusive property or privilege is claimed are defined as follows:

1. A seat assembly comprising, in combination, a hollow molded seat support including spaced walls and a series of spaced pairs of depressions extending inwardly from one wall to the other wall thereof, the one wall intermediate each pair of depressions being formed into a generally V-shaped rib portion, the walls of which merge into the depressions of such pair, a resilient foam cushion including a lower wall seating on the one wall of the seat support, a spaced upper wall, and an access passage through the cushion between the upper and lower walls opening to each of the rib portions, a seat cushion anchor member spanning the passage adjacent each rib portion, a hog ring type fastener encircling the anchor member and extending through and around each of the rib portions to secure the cushion to the seat support, the fasteners being insertable through the passage from the upper wall of the cushion prior to being installed in encircling relationship to the anchor member and rib portion, a cover over the seat support and foam cushion, and means securing the cover to the seat support.

2. A seat assembly comprising, in combination, a generally rectangularly shaped hollow molded seat support including spaced walls and a series of spaced pairs of depressions extending inwardly from one wall to the other wall thereof, the one wall intermediate each pair of depressions being formed into a generally V-shaped rib portion, the walls of which merge into the depressions of such pair, locating rib means extending outwardly of the one wall along a number of edge portions thereof, a resilient foam cushion including a lower wall seating on the one wall of the seat support, a spaced upper wall, and an access passage through the cushion between the upper and lower walls opening to each of the rib portions, the cushion being located on the one wall by the locating rib means, a seat cushion anchor member spanning the passage adjacent each rib portion, a hog ring type fastener encircling the anchor member and extending through and around each of the rib portions to secure the cushion to the seat support, the fasteners being insertable through the passage from the upper wall of the cushion prior to being installed in encircling relationship to the anchor member and rib portion, a cover over the seat support and foam cushion, and means securing the cover to the seat support.

3. A seat assembly comprising, in combination, a generally rectangularly shaped hollow molded seat support including spaced walls and a series of spaced pairs of depressions extending inwardly from one wall to the other wall thereof, the one wall intermediate each pair of depressions being formed into a generally V-shaped rib portion, the walls of which merge into the depressions of such pair, locating rib means extending outwardly of the one wall along a number of edge portions thereof, a resilient foam cushion including a lower wall seating on the one wall of the seat support, a spaced upper wall, and an access passage through the cushion between the upper and lower walls opening to each of the rib portions, the cushion being located on the one wall within the locating rib means, a seat cushion anchor member spanning the passage adjacent each rib portion, a hog ring type fastener encircling the anchor member and extending through and around each of the rib portions to secure the cushion to the seat support, the fasteners being insertable through the passage from the upper wall of the cushion prior to being installed in encircling relationship to the anchor member and rib portion, at least one edge portion of each wall being secured to each other to provide a flange, a cover over the seat support and foam cushion, and hog ring type fasteners securing the cover to the flange of the seat support.

4. A seat assembly comprising, in combination, a generally rectangularly shaped hollow molded seat support including spaced walls and a series of spaced pairs of depressions extending inwardly from one wall to the other wall thereof, the one wall intermediate each pair of depressions being formed into a generally V-shaped rib portion, the walls of which merge into the depressions of such pair, locating rib means extending outwardly of the one wall along a number of edge portions thereof, a resilient foam cushion including a lower wall seating on the one wall of the seat support, a spaced upper wall, and an access passage through the cushion between the upper and lower walls opening to each of the rib portions, the cushion being located on the one wall within the locating rib means, a seat cushion anchor member spanning the passage adjacent each rib portion, a hog ring type fastener encircling the anchor member and extending through and around each of the rib portions to secure the cushion to the seat support, the fasteners being insertable through the passage from the upper wall of the cushion prior to being installed in encircling relationship to the anchor member and rib portion, at least one edge portion of each wall being integrally secured to the other to provide an attachment flange, a series of depressions in such flange, a cover over the seat support and foam cushion, and hog ring type fasteners extending through the cover and each of the depressions to secure the cover to the seat support.

* * * * *